United States Patent Office 3,545,161
Patented Dec. 8, 1970

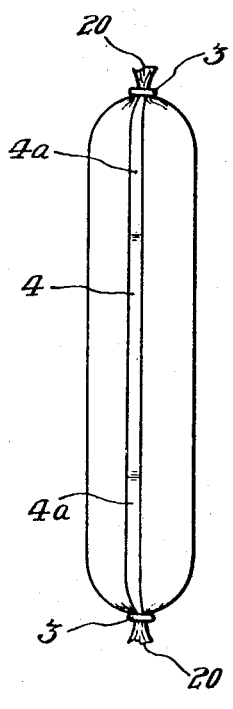
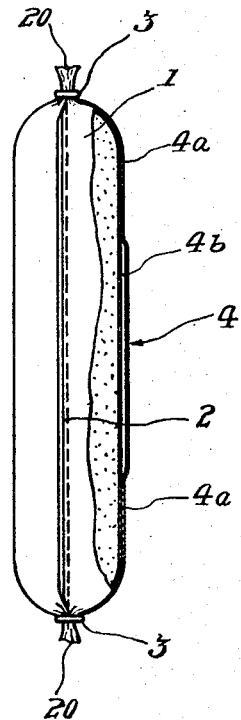

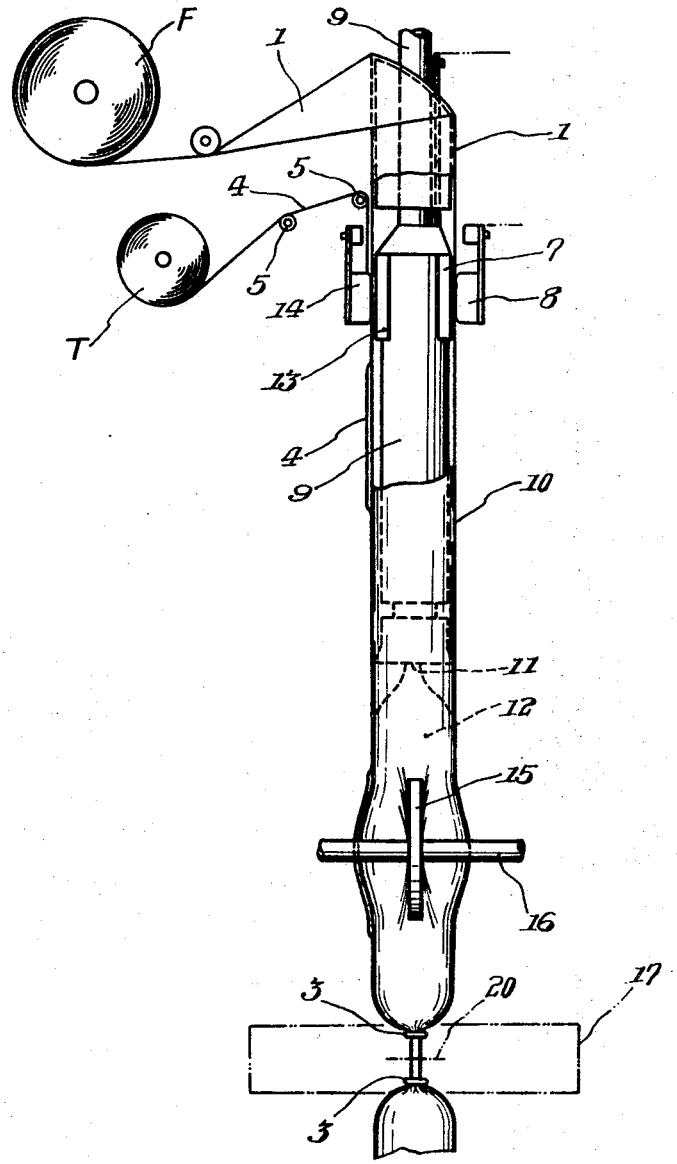

3,545,161
METHOD OF AND APPARATUS FOR CONTINUOUSLY FORMING A SERIES OF PACKAGES WITH OPENING TAPE MEANS
Shohei Hoshino, Toshiyuki Yoneda, Hidenobu Uezono, and Shizuo Kawano, Suzuka-shi, Japan, assignors to Asahi Dow Limited, Tokyo, Japan
Filed Feb. 1, 1968, Ser. No. 702,310
Claims priority, application Japan, Mar. 1, 1967, 42/12,554
Int. Cl. B65b 61/18
U.S. Cl. 53—14                                        4 Claims

ABSTRACT OF THE DISCLOSURE

In the process of forming a continuous string of connected packages, a continuous tape of pliable resin material is continuously fed to extend along the tubular casing as it is formed to receive meat or other fluent material and is welded to the casing at regular intervals to form film-tearing means on each of the connected packages.

---

This invention relates generally to the packaging of meat or similar material in a tube of copolymer resin film composed primarily of vinylidene chloride and more particularly to methods of and apparatus for fabricating a series of packages having opening means in the form of a longitudinally extending film-tearing tape partially welded to the tubular casing of the packages.

Recently, vinylidene-chloride base copolymer resins in film form such as "Saran" have come to be widely used in the packaging of different foods, including not only meat or similar products in paste-like form such as liver sausage but also a variety of Japanese-style foods in gel, paste-like or semifluid form since they are excellent as a packaging material for such paste-like or fluent materials because of their advantageous characteristics including impermeability to moisture and gases, shrinkability and transparency.

Use of vinylidene-chloride base copolymer resin film in the packaging of foods is recommendable because of the transparency of the film giving good appearance to the resulting products and desirable for long-period preservation of the foods but has involved some disadvantages: in fact, the high strength of the packaging film makes it rather difficult to open the package conventionally formed of such film and take out the content.

The vinylidene-chloride base copolymer resin film is inherently easy to tear because of its oriented crystalline structure, once cut or otherwise injured to start the line of tear, but, where no cutter or similar tool is available at hand to form in the film a cut or other flaw as a tear-starting point, it is extremely difficult to start tearing the resin film, as is well known.

Accordingly, the present invention has for its object to provide a method of and apparatus for obtaining food packages the casing of which is formed of vinylidene-chloride base resin film and has a tearing tape integrally attached thereto as a device conveniently usable to open the package when desired.

It is another object of the present invention to provide, in the process of packaging different foods and other products in an automatic fashion by a combination of different functions such as of advancing a continuous web or film of copolymer resin such as vinylidene chloride at a constant speed, forming the web into a tubular configuration, sealing or welding together the side edges of the web thus formed to obtain an integral tubular casing, filling the tube with material to be packaged at a predetermined filling rate, and gathering and closing the filled tube at predetermined spaced areas, and in association with a packaging machine of any known type, including the one disclosed in the specification of the U.S. Pat. No. 2,831,302, issued Apr. 22, 1958, to Hans A. Jensen et al., a novel technique of forming tape means on food packages as an opening device therefor which comprises continuously feeding a tape of vinylidene-chloride base resin film along the outside of the tubular formation of packaging film web at the same speed as that of the latter and directing the tape together with the packaging film to pass between positive and negative electrodes disposed respectively outside and inside the tubular film before the latter is filled with the material to be packaged, and intermittently directing a high-frequency current through the electrodes to weld together the tape and the casing film of the package at axially spaced areas.

These and other objects, features and advantages of the present invention will become apparent from the following description when taken in conjunction with the accompanying drawing, which illustrates one preferred embodiment of the invention and in which:

FIG. 1 is a side elevation, partly in section, illustrating one form of tubular packages formed by the method of the invention;

FIG. 2 is a view similar to FIG. 1 taken from the right of FIG. 1; and

FIG. 3 is a front elevation, partly in section, of an apparatus embodying the principles of the invention.

Referring to the drawing and first to FIGS. 1 and 2, there is shown a package, such as of sausage, fabricated according to the present invention, with a tearing tape secured to the tubular casing, which is formed of vinylidene-chloride base resin film.

In FIGS. 1 and 2, numeral 1 indicates the packaging film or tubular casing of the package; 2 indicates the line of longitudinal seam of the tubular casing; 3 indicates U-shaped closure bands fitted and clinched on both the top and bottom ends of the package; and 4 indicates a tearing tape of limited width secured to the casing by the method of the present invention. The tape 4 is welded to the casing 1 at longitudinally spaced areas 4a, defining therebetween a nonwelded tape portion 4b of an appropriate length to enable the tape to be pulled off with ease. In other words, the tape 4 is welded to the casing in such a manner that by simply applying a light pressure onto the package an opening can be formed between the nonwelded intermediate tape portion 4b and the adjacent area of the packaging film 1 to allow free insertion of a finger. By inserting some finger or other in such opening and pulling the tape 4 outwards, the tape and the opposite end portions of the casing 1, to which the tape portions 4a are welded, can readily be torn off to open the package as its opposite ends.

Reference is made next to FIG. 3, which illustrates the essential parts of an apparatus designed to perform the inventive method of forming tearing tape means and representing one specific embodiment of the present invention as applied to the well-known vertical type automatic continuous packaging machine, for example, disclosed in the United States patent specification referred to hereinbefore. As shown in this figure, a continuous web 1 of packaging film is fed from a stock roll F and is folded into a tubular formation while being guided downwardly, the opposite side edges of the folded web being brought into overlapping tube-forming relation about a tubular filling mandrel or feed pipe 9. Mounted on the pipe 9 is an internal sealing electrode 7 which cooperates with an external sealing electrode 8 disposed outside the feed pipe 9 in spaced relation thereto. In operation the overlapping edge portions of the web 1, passing between the two electrodes 7 and 8, are welded together in a continuous fashion, for example, by conducting a high-frequency current therethrough, to complete a tubular film casing 10. The filling mandrel 9 has a nozzle orifice 11 at its bottom and the material to be packaged passes downwardly through the mandrel and, leaving its bottom, is filled in the tubular film casing 10 as the latter also leaves the end of the mandrel 9, in the manner well known in the art.

Referring again to FIG. 3, a tape 4 of vinylidenechloride base resin film, having a relatively small width as shown in FIG. 2, is continuously fed from a tape stock roll T and guided by rolls 5 to one side of the tubular film formation 1 which is remote from the sealing electrodes 7 and 8. The tape 4, then proceeding downwardly along the tubular film formation 1 at the same speed and in direct contact therewith, passes between another pair of internal and external welding electrodes 13 and 14. Obviously, the internal electrode 13 is held to maintain contact with the inside surface of the proceeding tubular film casing 1 while the external electrode 14 is held to maintain contact with the outer surface of the tubular film 1 through the intermediary of the tape 4 proceeding downwardly with the tubular film. These electrodes 13 and 14 are connected with an oscillator provided separate from the one serving to energize the sealing electrodes 7 and 8 and are intermittently energized under control of limit switch means, which is operable at appropriate time intervals in association with a member of the packaging machine which is in motion during operation of the machine, for example, the shaft 16 of a pair of feed rollers normally rotating at a constant speed to downwardly draw the tubular film casing as filled with the material to be packaged, or the mechanism 17 operable to apply pairs of closure bands 3 to the filled tube 10 at regular intervals and subsequently sever it on line 20 between the adjacent two closure bands, or the void roll means provided to constrict and close the film tube at regular intervals. In this manner, the tape 4, passing between the electrodes 13 and 14, is bonded or welded to the tubular film at predetermined longitudinally spaced intervals and thus connected packages each in the form shown in FIGS. 1 and 2 are obtained.

The width of tape usable in the present invention should be selected in the range of from approximately 5 mm. to 15 mm. considering the ease of welding, external appearance and ease of tearing.

We claim:

1. In an automatic process of forming a series of packages wherein a web of thin pliant heat sealable material is continuously formed into a tubular shape, the opposite side edges of the web being brought together into overlapping tube-forming relation and welded together to form a continuous tube of film, the material to be packaged is filled in the film tube, and the filled tube is constricted and closed at predetermined longitudinally spaced intervals, a method of forming opening tape means on the film tube comprising the steps of continuously feeding and advancing a film-tearing tape of pliable material longitudinally along the outside of the film tube at the same speed as that of the latter, and intermittently directing a high frequency current through the tape and the adjacent wall of the film tube to weld the tape to the outside of the film tube at predetermined longitudinally spaced intervals to provide an appropriate length of a nonwelded tape portion between two longitudinally spaced welded areas for allowing the insertion of one's finger or other tool and pulling said tearing tape.

2. An automatic process of forming a series of packages as in claim 1 including the steps of severing the film tube and tape at the constricted areas to form individual packages, and timing the application of said high frequency current in relation to the advancing of the film tube to obtain welded areas only adjacent each end of each package.

3. In an automatic packaging machine of the type including means for continuously feeding and guiding a web of thin pliant heat sealable material so as to form a continuous tube of film by overlapping the longitudinal edges of the web, a sealing mechanism including a pair of internal and external electrodes cooperable to weld together the overlapping web edges, nozzle means for supplying material to be packaged in the film tube so formed, and means for constricting and severing the filled film tube at predetermined longitudinally spaced intervals, a device for forming opening tape means on the film tube as the latter is formed comprising, in combination, means for continuously feeding and advancing a film tearing tape of pliable material, narrower than said film tube, longitudinally along the outside of the film tube at the same speed as that of the latter, and a welding mechanism including a pair of cooperating electrodes disposed respectively inside and outside of the film tube being advanced and intermittently energizable to weld said tape to the outside of the film tube at predetermined longitudinally spaced intervals to provide an appropriate length of a nonwelded tape portion between two longitudinally spaced welded areas for allowing the insertion of one's finger or other tool and pulling said tearing tape.

4. In a packaging machine as in claim 3 wherein said welding mechanism is energized to weld said tape to said film tube only at and adjacent the portions thereof to be constricted and secured whereby both ends of the packages formed can be opened.

References Cited
UNITED STATES PATENTS

| 2,194,451 | 3/1940 | Soubier | 53—28X |
| 2,653,432 | 9/1953 | Wright | 53—133 |
| 3,000,155 | 9/1961 | Gausman | 53—182X |
| 3,381,441 | 5/1968 | Condo et al. | 53—182X |

FOREIGN PATENTS 1,012,510  12/1965  Great Britain.

TRAVIS S. McGEHEE, Primary Examiner

N. ABRAMS, Assistant Examiner

U.S. Cl. X.R.

53—28, 133, 180